United States Patent
Sarikaya et al.

(10) Patent No.: US 8,560,856 B2
(45) Date of Patent: Oct. 15, 2013

(54) LIGHTWEIGHT SECURE NEIGHBOR DISCOVERY PROTOCOL FOR LOW-POWER AND LOSSY NETWORKS

(75) Inventors: Behcet Sarikaya, Wylie, TX (US); Yangsong Xia, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 102 days.

(21) Appl. No.: 13/250,550

(22) Filed: Sep. 30, 2011

(65) Prior Publication Data

US 2012/0084568 A1    Apr. 5, 2012

Related U.S. Application Data

(60) Provisional application No. 61/389,068, filed on Oct. 1, 2010.

(51) Int. Cl.
*H04L 9/32* (2006.01)

(52) U.S. Cl.
USPC .............................. 713/176; 713/179; 380/282

(58) Field of Classification Search
None
See application file for complete search history.

(56) References Cited

U.S. PATENT DOCUMENTS

| | | | |
|---|---|---|---|
| 6,618,483 | B1 | 9/2003 | Vanstone et al. |
| 6,704,870 | B2 | 3/2004 | Vanstone et al. |
| 7,215,773 | B1 | 5/2007 | Johnson |

OTHER PUBLICATIONS

Shelby et al. (hereinafter Shelby), "Neighbor Discovery for 6LoWPAN", Internet-draft, May 28, 2009, pp. 1-52.*

Cheneau et al, "Significantly Improved Performances of the Cryptographically Generated Address thanks to ECC and GPGPU", Elsevier, Nov. 5, 2009, pp. 1-12.*

"Public Key Cryptography for the Financial Services Industry The Elliptic Curve Digital Signature Algorithm (ECDSA)," American National Standards for Financial Services, ANS X9.62-2005, Nov. 16, 2005, 163 pages.

"Standards for Efficient Cryptography SEC 1: Elliptic Curve Cryptography," Certicom Research, Version 2.0, May 21, 2009, 144 pages.

"Standards for Efficient Cryptography SEC 2: Recommended Elliptic Curve Domain Parameters," Version 2.0, Certicom Research, Jan. 27, 2010, 37 pages.

"Part 15.4: Wireless Medium Access Control (MAC) and Physical Layer (PHY) Specifications for Low-Rate Wireless Personal Area Networks (WPANs)," IEEE Standard for Information Technology—Telecommunications and Information Exchange Between Systems—Local and Metropolitan Area Networks—Specific Requirements, IEEE Computer Society, IEEE Standard 802.15.4—2006, Sep. 8, 2006, 305 pages.

Turner, et al., "Elliptic Curve Cryptography Subject Public Key Information," RFC 5480, Mar. 2009.

Shelby, Ed., et al., "Neighbor Discovery Optimization for Low-Power and Lossy Networks," draft-ietf-6lowpan-nd-13.txt, Sep. 15, 2010, 54 pages.

(Continued)

*Primary Examiner* — Shewaye Gelagay
(74) *Attorney, Agent, or Firm* — Conley Rose, P.C.; Grant Rodolph; Brandt D. Howell (57) ABSTRACT

An apparatus comprising a network node configured to support a lightweight secure neighbor discovery (LSEND) protocol for securing neighbor discovery protocols (NDP) for energy-aware devices, wherein the network node is configured to wirelessly communicate with a host node, wherein the network node is configured to exchange LSEND protocol messages with the host node, and wherein the LSEND protocol uses reduced public key and signature sizes and more lightweight signature calculations in comparison to a secure neighbor discovery (SEND) protocol for securing NDP communications that are more suitable for low-power and lossy networks (LLNs).

25 Claims, 6 Drawing Sheets

(56) References Cited

OTHER PUBLICATIONS

Cheneau, et al., "ECC Public Key and Signature Support in Cryptographically Generated Addresses (CGA) and in the Secure Neighbor Discovery (SEND)," draft-cheneau-csi-ecc-sig-agility-02.txt, Jun. 16, 2010, 31 pages.

"Digital Security Standard (DSS)," Federal Information Processing Standards Publications, FIPS PUB 186-3, National Institute of Standards and Technology, Jun. 2009, 130 pages.

Cheneau, et al., "Signature Algorithm Agility in the Secure Neighbor Discovery (SEND) Protocol," draft-cheneau-csi-send-sig-agility-02.txt, Jun. 16, 2010, 31 pages.

"NIST Comments on Cryptanalytic Attacks," National Institute of Standards and Technology, Computer Security Division—Computer Security Resource Center, http://csrc.nist.gov/groups/ST/hash/statement.html, Jan. 5, 2009, 2 pages.

Thomas, et al., "IPv6 Stateless Address Autoconfiguration," RFC 4862, Sep. 2007.

Narten, et al., "Neighbor Discovery for IP version 6 (IPv6)," RFC 4861, Sep. 2007.

Aura, "Cryptographically Generated Addresses (CGA)," RFC 3972, Mar. 2005.

Arkko, Ed., et al., "Secure Neighbor Discover (SEND)," RFC 3971, Mar. 2005.

Bradner, "Key Words for Use in RFCs to Indicate Requirement Levels," RFC 2119, Mar. 1997.

Gundavelli, Ed., et al., "Proxy Mobile IPv6," RFC 5213, Aug. 2008.

Shelby, Ed., et al., "Neighbor Discovery Optimization for Low Power and Lossy Networks (6LoWPAN)," draft-ietf-6lowpan-nd.17.txt, Jun. 13, 2011, 61 pages.

Cheneau, T., et al., "Significantly Improved Performances of the Cryptographically Generated Addresses Thanks to ECC and GPGPU," Computers & Security/ Elsevier, vol. 29, Dec. 13, 2009, pp. 419-431.

Sarikaya, B., et al., "Lightweight Secure Neighbor Discovery for Low-Power and Lossy Networks," draft-sarikaya-lwip-cgand-00.txt, Oct. 4, 2010, pp. 1-12.

Foreign Communication From A Related Counterpart Application, PCT Application PCT/US2011/054328, International Search Report dated Dec. 29, 2011, 4 pages.

Foreign Communication From A Related Counterpart Application, PCT Application PCT/US2011/054328, Written Opinion dated Dec. 29, 2011, 9 pages.

\* cited by examiner

LIGHTWEIGHT SECURE NEIGHBOR DISCOVERY PROTOCOL FOR LOW-POWER AND LOSSY NETWORKS

CROSS-REFERENCE TO RELATED APPLICATIONS

The present application claims the benefit of U.S. Provisional Patent Application No. 61/389,068 filed Oct. 1, 2010 by Behcet Sarikaya et al. and entitled "Lightweight Secure Neighbor Discovery for Low-Power and Lossy Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Neighbor discovery (ND) for Internet Protocol (IP) version six (IPv6) is described in the Internet Engineering Task Force (IETF) in Request for Comment (RFC) 4861, and stateless address auto-configuration is described in RFC 4862, both of which are incorporated herein by reference. The ND for IPv6 and stateless address auto-configuration in RFC 4861 and RFC 4862 are together referred to as neighbor discovery protocols (NDP) and are defined for regular hosts operating in normal (non-lossy) wired/wireless links. NDP defined by IETF in RFC 4861 and RFC 4862 operate on the link local to the nodes and the routers. NDP are subject to many types of security attacks and can be secured without using Internet Protocol Security (IPsec), i.e., by using a Secure Neighbor Discovery (SEND) protocol. However, the SEND protocol is not suitable in many instances and requires optimization for more resource constrained and low power hosts, which may operate in lossy wireless links. Examples of low power hosts or nodes that operate in lossy wireless links include wireless mobile devices, such as smart phones, tablets, and laptops, for example that use wireless IP links, such as in Wireless Fidelity (WiFi) networks. For example, using SEND is substantially costly (in terms of resources) in such resource constrained nodes. Neighbor discovery optimizations for IPv6 over Low power Wireless Personal Area Networks (6LoWPAN) include simple optimizations such as a host address registration feature using an address registration option, which is sent in unicast Neighbor Solicitation (NS) and Neighbor Advertisement (NA) messages, as described by Z. Shelby in Internet Engineering Task Force (IETF) publication draft-ietf-6lowpan-nd-17, June 2011, which is entitled "Neighbor Discovery Optimization for Low Power and Lossy Networks", and is incorporated herein by reference.

SUMMARY

In one embodiment, the disclosure includes an apparatus comprising a network node configured to support a lightweight secure neighbor discovery (LSEND) protocol for securing NDP for energy-aware devices, wherein the network node is configured to wirelessly communicate with a host node, wherein the network node is configured to exchange LSEND protocol messages with the host node, and wherein the LSEND protocol uses reduced public key and signature sizes and more lightweight signature calculations in comparison to a SEND protocol for securing NDP communications that are more suitable for low-power and lossy networks (LLNs).

In another embodiment, the disclosure includes a network component comprising a receiver at a host configured to receive a router advertisement (RA) from a router, a processor configured to generate a public key for the host using Elliptic Curve Cryptography (ECC) and to generate a cryptographically generated address (CGA) using the ECC generated public key and an elliptic curve digital signature algorithm (ECDSA), and a transmitter configured to send the ECC generated public key and the ECDSA generated CGA to the router in a unicast NS message.

In another embodiment, the disclosure includes a method implemented by a network apparatus comprising sending a RA message to a host node, receiving a NS message for address registration comprising a CGA parameters and digital signature option from the host node, registering a CGA for the host node that is indicated in the NS message in a neighbor cache, and sending a NA message to inform the host node of successful registration.

In yet another embodiment, the disclosure includes an apparatus comprising a LSEND for LLN node configured to send an address registration NS message after adding a CGA parameters and digital signature option and a source address that is set to the LSEND for LLN node's CGA.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, NDP are not secure, e.g., when physical security on the link is not assured and is vulnerable to attacks. The SEND protocol is defined for securing NDP in RFC 3971, which is incorporated herein by reference. CGAs are used in SEND as described in RFC 3972, which is also incorporated herein by reference. The SEND uses the Rivest, Shamir, and Adleman (RSA) signature algorithm, which is typically computationally heavy and not suitable for use in low-power and resource constrained nodes, e.g., as indicated by T. Cheneau et al. in IETF publication draft-cheneau-csi-send-sig-agility-02, June 2010, entitled "Signature Algorithm Agility in the Secure Neighbor Discovery (SEND) Protocol", which is incorporated herein by reference. In the RSA algorithm, a RSA public key and a signature are used, which may lead to relatively long message sizes that are not suitable for use in links that are wireless, low-bit rate, short range, asymmetric, and/or non-transitive, e.g., as described in the Institute of Electrical and Electronics Engineers (IEEE) 802.15.4 standard, which is incorporated herein by reference.

Disclosed herein are systems and methods for implementing a LSEND protocol that may be suitable for energy-aware devices or LLNs, such as machine-to-machine (M2M) networks or 6LoWPANs. The systems and methods may extend NDP for 6LoWPAN with cryptographically generated addresses. The system may comprise nodes configured to generate a CGA using an ECC instead of RSA generated public key, register the CGA with a default system router, and periodically refresh the registration. A CGA and a digital signature may be calculated using the ECC public key of the associated node. The digital signature may be calculated using the ECC public key and an ECDSA, which may be lightweight (relatively easy to implement without substantial use of computation resources) and may lead to reduced packet sizes.

Figure 1:
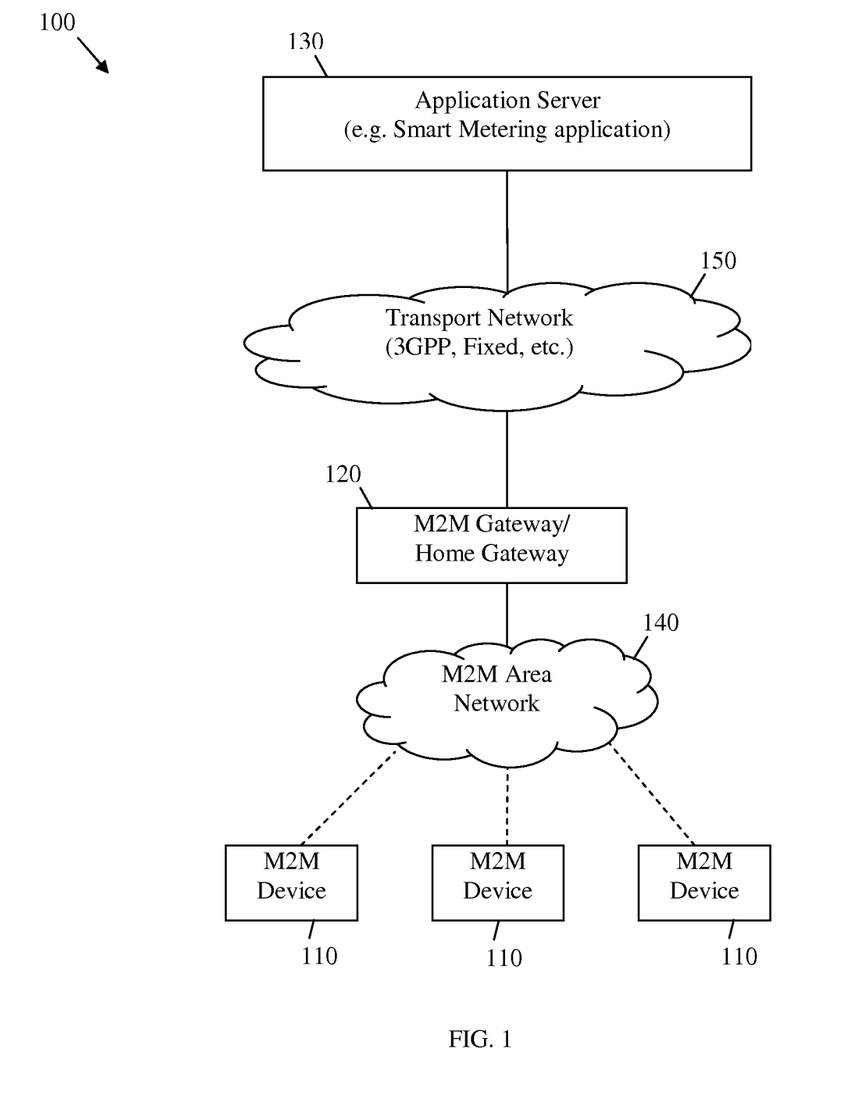
FIG. 1 is a schematic diagram of one embodiment of a wireless access network system.

FIG. 1 illustrates one embodiment of a wireless access network system 100, which may correspond to a LLN, such as 6LoWPAN. For instance, the wireless access network system 100 may be used in a M2M network or scheme to enable wireless communications and proper operations for a plurality of devices (e.g., machines) via wireless links. The wireless access network system 100 may comprise a plurality of M2M devices 110, a M2M gateway/home gateway 120, and an application server 130. The M2M gateway/home gateway 120 may be coupled to the M2M devices 110 via a M2M area network 140, and to the application server 130 via a transport network 150. The components of the wireless access network system 100 may be arranged as shown in FIG. 1.

The M2M devices 110 may be any devices that are configured to communicate, via wireless and/or wired (fixed) links with the M2M area network 140. The M2M devices 110 may be machines configured to communicate with the M2M area network 140 to operate properly, e.g., in an automatic manner without user intervention. For instance, the M2M devices 110 may be home appliance devices or machines (televisions, electronics, refrigerators, air-conditioning systems, water heaters, washers/dryers, etc.), office machines (e.g., copiers, fax machines, computers, servers, etc.), industrial machines (e.g., bank transaction machines, factory machines, etc.), or any other types of machines that operate by communicating with the M2M area network 140 without human intervention. The M2M devices 110 may also communicate with each other via the M2M area network 140. Specifically, at least some of the M2M devices 110 may be mobile equipment that use wireless links to access the M2M area network 140. The M2M device may also be referred to herein as a node, a mobile node (MN), or a client node.

The M2M area network 140 may be any network configured to communicate with the M2M devices 110 and the M2M gateway/home gateway 120, and thus allow the mobile devices access to the application server 130. For instance, the M2M area network 140 may be an IEEE 802.11 Wireless Local Area Network (WLAN), also referred to as a Wireless Fidelity (WiFi) network, or any other type of WLAN or wireless access network that establishes wireless communication links with the M2M devices 110. In some cases, the M2M area network may also use wired or fixed links to connect to some of the M2M devise 110. The M2M gateway/home gateway 120 may be any component, device, or apparatus configured to communicate with both the M2M area network 140 and the application server 130, via the transport network 150, to allow the M2M area network 140 and the M2M devices 110 access to the application server 130. For instance, the M2M gateway/home gateway 120 may comprise one or more gateway routers that communicate via wireless and/or fixed links with the M2M area network 140 and the transport network 150.

The transport network 150 may be any network, e.g., a third party network, configured to allow communications between the M2M gateway/home gateway 120 and the application server 130. For instance, the transport network 150 may be a third Generation Partnership Project (3GPP) network, a Worldwide Interoperability for Microwave Access (WiMAX) network, or any other wireless or fixed access network. The application server 130 may be configured to provide a service or application for one or more of the M2M devices 110. For example, the application server 130 may be a smart metering application server configured to manage a plurality of smart meters for public parking. Another example for the application server 130 may be a temperature/air-conditioning control server configured to control the temperature settings of a plurality of air-conditioning units in a building or site to regulate temperature in the building efficiently and control air-conditioning cost effectively.

The wireless access network system 100 and at least some of its components may also support NDP and LSEND protocols for energy-aware devices, e.g., such as in LLNs. The LSEND protocol may be based on the SEND protocol requirements for the LLNs, as described in draft-ietf-6lowpan-nd-13, such as for host-initiated interactions (e.g., by the M2M device 110) to enable sleeping hosts, elimination of multicast-based address resolution for hosts, and/or other functions. The LSEND protocol may comprise additional (new) options (described below) that may be added to NS/NA messages and may lead to reduced packet sizes. The NS/NA messages may be unicast instead of multicast messages, for instance may be sent using an Internet Control Message Protocol (ICMP). The reduced packet sizes may facilitate low-power transmission by resource constrained nodes, e.g., the M2M devices 110, on lossy links, e.g., wireless links and/or links that have relatively low power and/or low signal to noise ratio or SNR. The LSEND protocol may also comprise CGA generation, and signature and key hash calculation that use a secure hash algorithm (SHA-2) instead of SHA-1, and hence avoid the flaws in SHA-1. Further ECC and ECDSA may be used, e.g., with P-256 curve, to reduce public key and signature sizes and implement a lightweight (non-intensive) signature calculation. These features of the LSEND protocol are described in more detail below.

Figure 2:
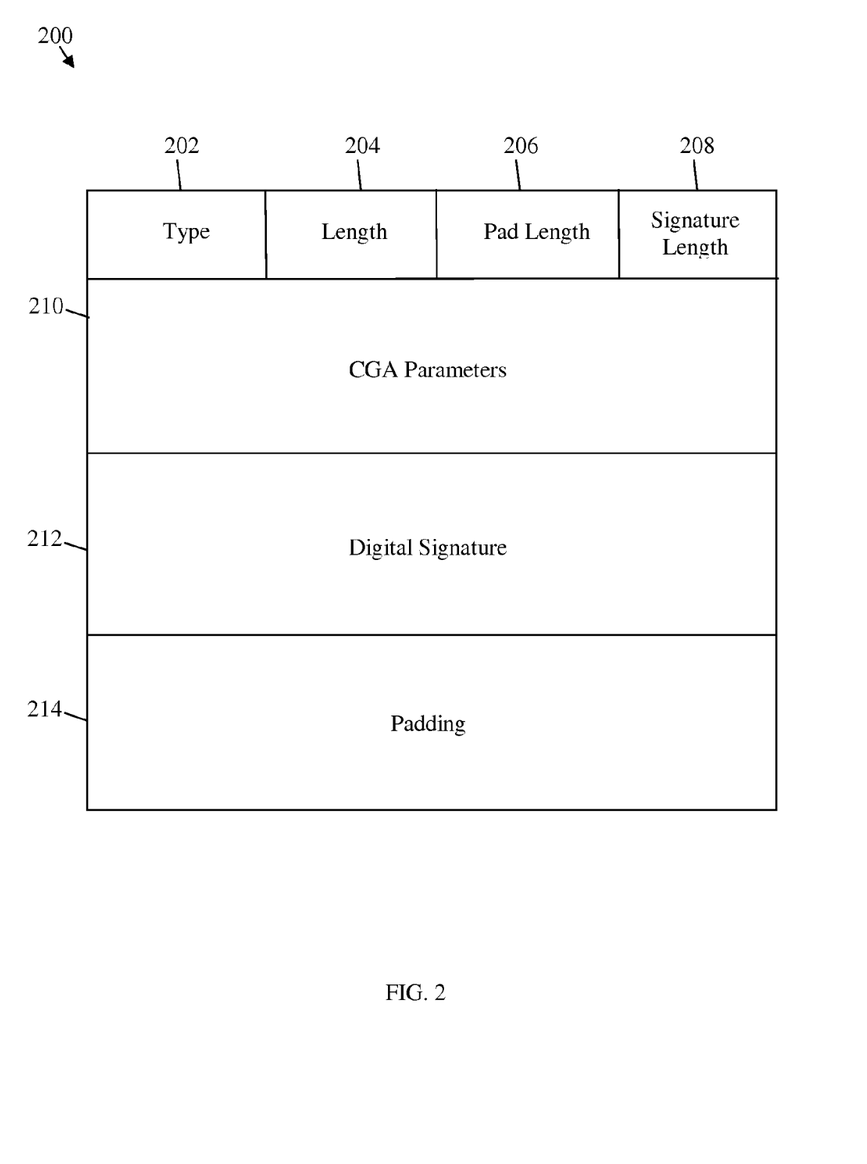
FIG. 2 is a schematic diagram of one embodiment of a cryptographically generated address parameters and digital signature option.

FIG. 2 illustrates an embodiment of a CGA parameters and digital signature option 200, which may be used in the LSEND protocol to secure NDP for energy-aware devices. The CGA parameters and digital signature option 200 may be included in the messages exchanged between the nodes of a LLN, e.g., in the wireless access network system 100. For instance, the CGA parameters and digital signature option 200 may be included in the RA and NS messages exchanged between a 6LoWPAN border router (6LBR) and a 6LoWPAN node (6LN), as described in more detail below. The 6LBR may be located in the M2M area network 140 or correspond to the M2M gateway/home gateway 120, and the 6LN may correspond to the M2M device 110. The CGA parameters and digital signature option 200 may comprise a type field 202, a length field 204, a padding (pad) length field 206, a signature (sig.) length field 208, a CGA parameters field 210, a digital signature field 212, and a padding field 214.

The type field 202 may be about 8 bits long and may be set to a value that indicates that the option 200 is a CGA parameters and digital signature option. The length field 204 may be about 8 bits long and may indicate the length of the option 200 including all the fields above with padding. The length may be indicated in units of 8 octets. The pad length field 206 may be about 8 bits long and may indicate the length of the padding field 214. The sig. length field 208 may be about 8 bits long and may indicate the length of the digital signature field 212. The CGA parameters field 210 may have a variable length and may comprise the CGA parameters data structure, e.g., as described in section 4 in RFC 3972. The digital signature filed 212 may have a variable length and may comprise an ECDSA generated signature, e.g., produced using the SHA-256 and P-256 curve of Federal Information Processing Standards (FIPS)-186-3. The digital signature may be generated as described below. The padding field 214 may have a variable length that may be set so that the length of the option 200 is a multiple of 8 bits.

Figure 3:
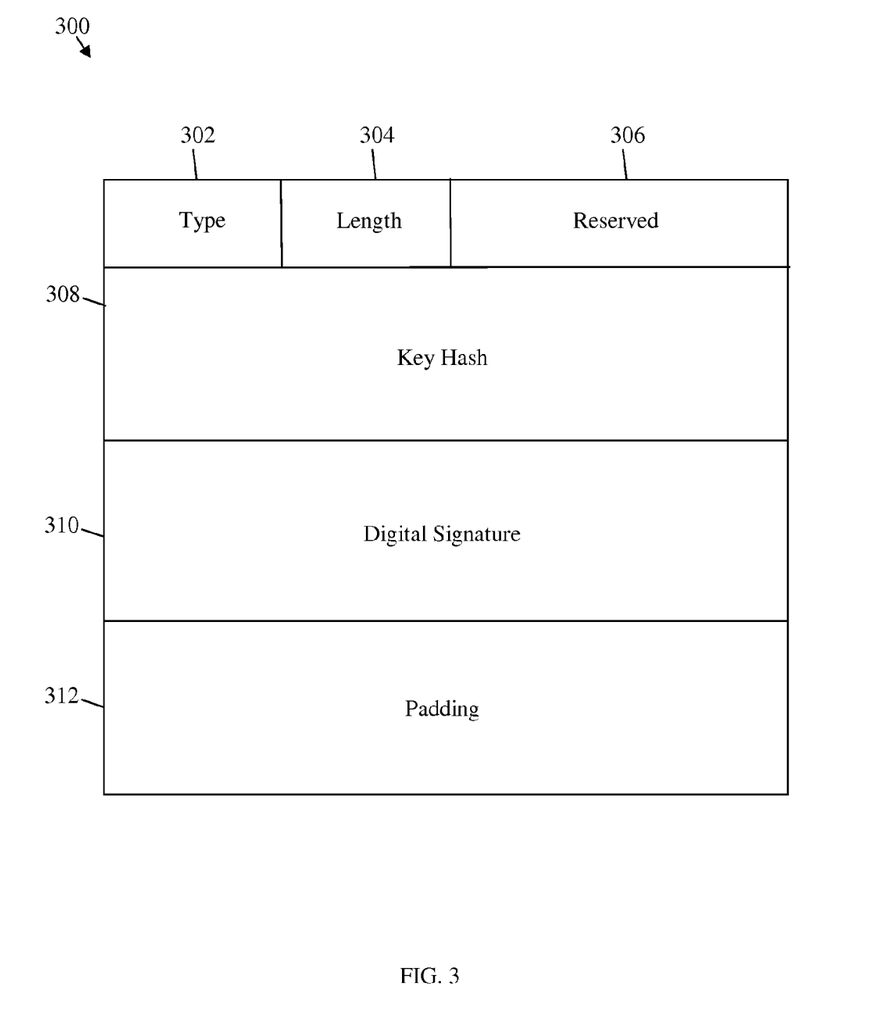
FIG. 3 is a schematic diagram of one embodiment of a digital signature option.

FIG. 3 illustrates an embodiment of a digital signature option 300, which may be used in the LSEND protocol to secure NDP for energy-aware devices. The digital signature option 300 may be included in the messages exchanged between the nodes of the LLN (e.g., the wireless access network system 100), for instance in the RA and NS messages exchanged between a 6LBR (e.g., a NAS 120) and a 6LN (e.g., a M2M device 110), as described in more detail further below. The digital signature option 300 may comprise a type field 302, a length field 304, a reserved field 306, a key hash field 308, a digital signature field 310, and a padding field 312.

The type field 302 may be about 8 bits long and may be set to a value that indicates that the option 300 is a digital signature option. The length field 304 may be about 8 bits long and may indicate the length of the option 300 including all the fields above with padding in units of 8 octets. The reserved field 306 may be about 16 bits long and may be reserved, thus it may not be used. The key hash field 308 may be a 128-bit field that comprises the most significant (leftmost) 128 bits of a SHA-2 hash of the public key used for constructing the signature. This scheme may be similar to the scheme used in RFC 3971 except that SHA-2 is used instead of SHA-1. The digital signature filed 310 may have a variable length and comprise ECDSA signature, e.g., produced using the SHA-256 and P-256 curve of FIPS-186-3. The digital signature may be generated as described below. The padding field 312 may have a variable length that may be set so that the length of the option 300 is a multiple of 8 bits.

As described above, ECC may be used to calculate the CGA and the digital signature, which may require some modifications to the messages and protocol described in RFC 3971 and RFC 3972. The digital signature may be generated by using the sender's (node's) private key, for instance over the sequence of octets specified in section 5.2 of RFC 3971 and up to all NDP options preceding the digital signature option that comprises an ECC digital signature. The signature value may be computed using the ECDSA as defined in "Standards for Efficient Cryptography Group. SEC 1: Elliptic Curve Cryptography", September 2000, which is described herein by reference, and the hash function SHA-256.

The public key may be one parameter of the CGA parameters, as described above. The public key may be a Distinguished Encoding Rules (DER)-encoded Abstract Syntax Notation One (ASN.1) structure of the type SubjectPublicKeyInfo and formatted as an ECC public key. An AlgorithmIdentifier, contained in the ASN.1 structure of type SubjectPublicKeyInfo, may be an (unrestricted) id-ecPublicKey algorithm identifier, which may have object identifier (OID) 1.2.840.10045.2.1. The subjectPublicKey may be formatted as an ECC public key, e.g., as specified in section 2.2 of RFC 5480, which is incorporated herein by reference. The ECC public key length may be determined by the namedCurves parameter stored in an ECParameters field of the AlgorithmIdentifier. The curve secp256r1 corresponding to P-256 may be used, which may have OID 1.2.840.10045.3.1.7.

Figure 4:
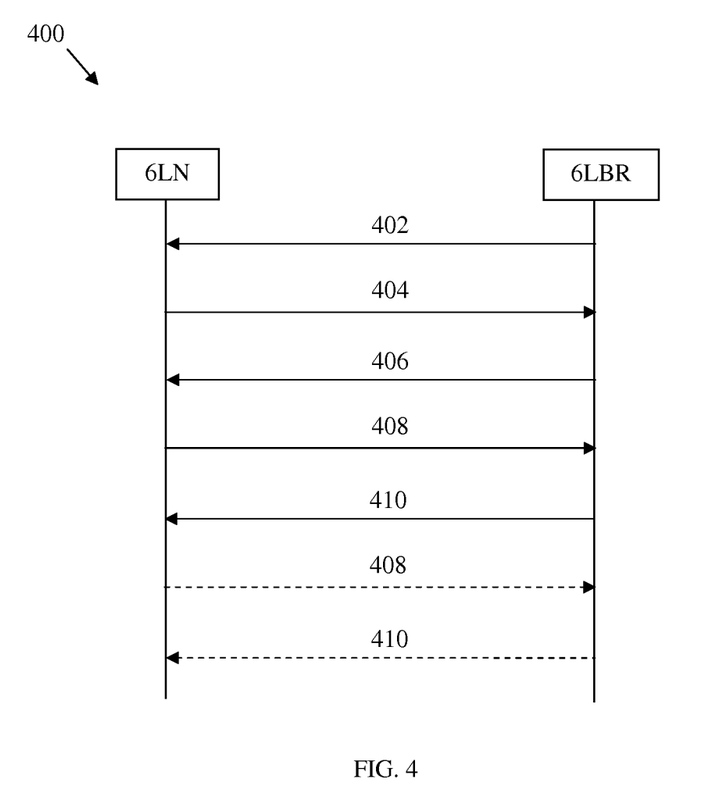
FIG. 4 is a flowchart of an embodiment of a lightweight SEND protocol exchange.

FIG. 4 illustrates a flowchart of an embodiment of a LSEND protocol exchange 400, which may be implemented to secure NDP for energy-aware devices or in LLNs. The LSEND protocol exchange 400 may be implemented between a host node and a network node, e.g., between a 6LN (e.g., a M2M device) and a 6LBR (e.g., a home gateway), to exchange CGA parameters and digital signature data, which may then be use for securing NDP exchanges. The LSEND protocol for LLNs may be implemented using some modifications to the protocol described in draft-ietf-6lowpan-nd-13. Initially, the network node (e.g., 6LBR) may send a RA message 402 to the host node (e.g., 6LN). The host node may receive the RA message 402 and generate its own CGA using ECC as described above.

The host node may then send a neighbor solicitation (NS) message 404, which may comprise an address registration option (ARO) to the network node. The NS message 404 may be referred to as an address registration message and may comprise the CGA generated by the host node, perhaps in the form of the CGA parameters and digital signature option 200. The source address in the NS message 404 may be set to the CGA generated by the host node. The ARO in the NS message 404 may comprise an owner interface identifier field (e.g., an extended unique identifier (EUI)-64) that may be set to the rightmost 64 bits of the generated CGA. The CGA parameters field 210 in the CGA parameters and digital signature option 200 may comprise a subnet prefix field that may be set to the leftmost 64 bits of the generated CGA. The CGA parameters field 210 may also comprise a public key that may be set to the host node's ECC public key.

The network node may receive the NS message 404 and verify the source address, e.g., as described in section 5.1.2 of RFC 3971, using the indicated source address and CGA parameters field 210 in the NS message 404. After successfully verifying the address, the network node may implement a cryptographic check of the digital signature included in the digital signature field 212 (of the CGA parameters and digital signature option 200) in the NS message 404. If all checks succeed, then the network node may perform a duplicate address detection procedure on the address. If the duplicate address procedure succeeds (e.g., no duplicate address is found), then the network node may register the CGA in a neighbor cache. The network node may also cache the host node's public key.

Subsequently, the network node may send a neighbor advertisement (NA) message 406 as a reply to confirm the host node's registration. A status field in the NA message 406 may be set to zero to indicate success of registration. Thus, initial address registration of the host node may be achieved. However, the address registration may require subsequent refreshing, e.g., after the neighbor cache entry times out or expires. To refresh the neighbor cache entry, the host node may send a second NS message 408 that comprises the digital signature option 300. A key hash field that is a hash of the host node's public key may be set in the key hash field 308 (of the digital signature option 300) in the second NS message 408. The digital signature field 310 may also be set in the second NS message 408 as described above.

The network node may then receive the second NS message 408. The network node may use the key hash field 308 in the digital signature option 300 to find the client node's public key from the neighbor cache. The network node may also verify the digital signature in the second NS message 408. In case of successful verification, the network node may send back an address registration NA message 410 to the host node and set the status field in the NA message 408 to zero indicating successful refreshment of the CGA of the host node. The refresh NS and NA exchanges (messages 408 and 410) may be repeated as many times as needed to refresh and hence prevent the host node's CGA from expiring in the neighbor cache at the network node side.

In an embodiment, the NS message 404 may comprise an about 40 byte header and an ARO that is about 16 octets. The DER-encoded ECC public key for P-256 curve in the NS message 404 may be about 88 octets long. When using ECDSA for P-256 curve, the digital signature field 212 in the NS message 404 may be about 71 octets long without padding, as described by T. Cheneau et al. in IETF publication in draft-cheneau-csi-ecc-sig-agility-02, June 2010, entitled "ECC public key and signature support in Cryptographically Generated Addresses (CGA) and in the Secure Neighbor Discovery (SEND)", which is incorporated herein by reference. The CGA parameters in the CGA parameters and digital signature option 200 in the NS message 404 may comprise an about 16 octet modifier, an about 8 octet prefix that may be obtained from the RA message 402 from the network node, an about one octet collision count, and an about 88 octet public key. The digital signature may be about 71 octets. The CGA parameters and digital signature option 200 may be about 184 octets with a padding size of about zero octets. The total message size of an LSEND NS message 404 may be about 240 octets, and such a message may be encapsulated into about three IEEE 802.15.4 standard frames.

The second NS message 408 may comprise an access request object (ARO), which may be about 16 octets in size and a digital signature option 300 that comprises an about 16 octet key hash, an about 71 octet digital signature, and an about five octet padding. The second NS message 408 may be about 152 octets long including a header. Such a message may be encapsulated in about two IEEE 802.15.4 standard frames. The sizes of the NS message 404 and the second NS message 408 in the LSEND protocol may be substantially smaller than the sizes of similar purpose or corresponding messages in the SEND protocol.

Figure 5:
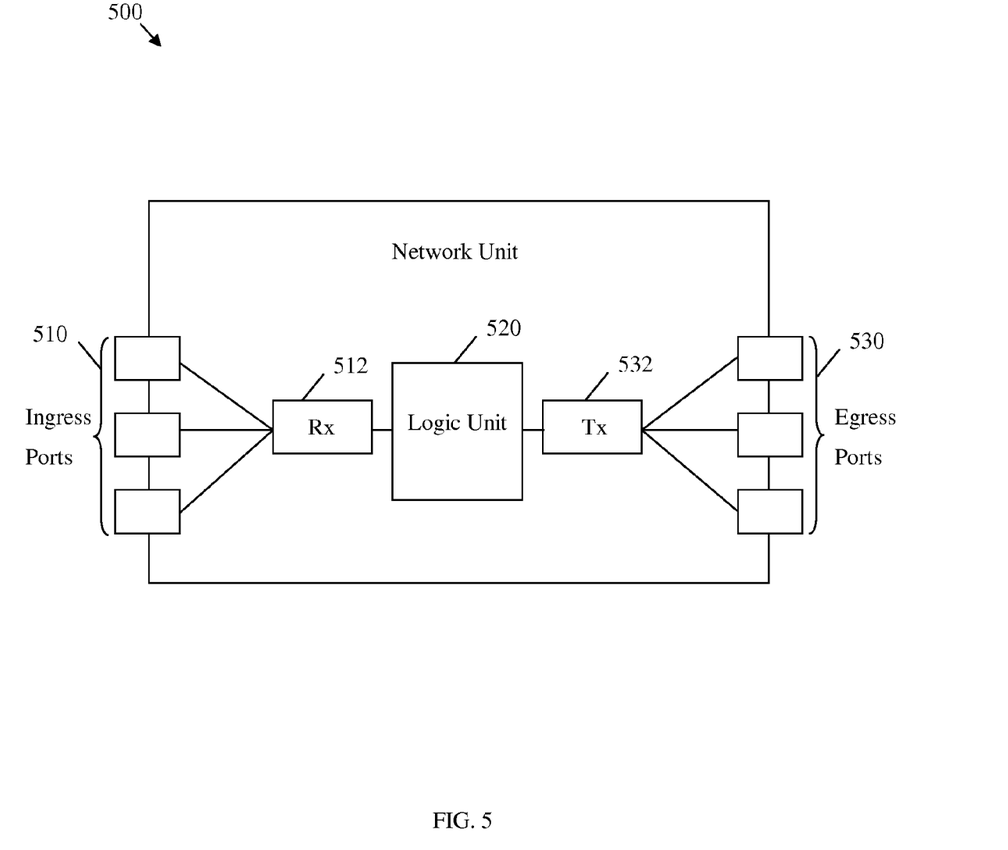
FIG. 5 is a schematic diagram of an embodiment of a network unit.

FIG. 5 illustrates an embodiment of a network unit 500, which may be any device that transports packets through a network. For instance, the network unit 500 may be located in any of the network components described above, such as in the network node, the host node, or both in the LSEND protocol exchange 400. The network unit 500 may comprise one or more ingress ports 510 coupled to a receiver 512 (Rx), which may be configured for receiving packets or frames, objects, options, and/or Type Length Values (TLVs) from other network components. The network unit 500 may comprise a logic unit or processor 520 coupled to the receiver 512 and configured to process the packets or otherwise determine to which network components to send the packets. The logic unit or processor 520 may also be configured to implement or support the LSEND protocol exchange 400. The logic unit or processor 520 may be implemented using hardware, software, or both. The network unit 500 may also comprise one or more egress ports 530 coupled to a transmitter 532 (Tx), which may be configured for transmitting packets or frames, objects, options, and/or TLVs to other network components.

Figure 6:
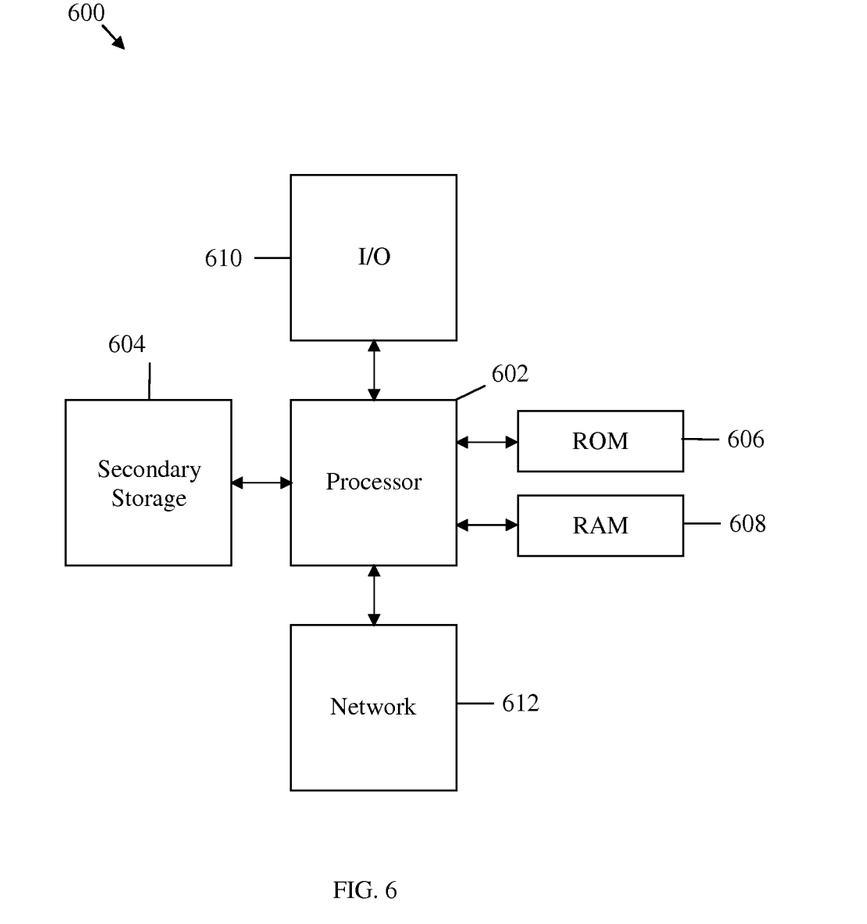
FIG. 6 is a schematic diagram of an embodiment of a general-purpose computer system.

The network components and/or methods described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs) and/or digital signal processors (DSPs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to second storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
    a network node configured to implement a lightweight secure neighbor discovery (LSEND) protocol for securing neighbor discovery protocols (NDP) for energy-aware devices,
    wherein the network node is configured to wirelessly communicate with a host node,
    wherein the network node is configured to exchange LSEND protocol messages with the host node,
    wherein implementing the LSEND protocol comprises:
        sending a router advertisement (RA) message to the host node; and
        receiving a first neighbor solicitation (NS) message for address registration from the host node,
    wherein the RA message, the NS message, or both comprise a cryptographically generated address (CGA) parameters and digital signature option that comprises:
        a type field that is set to a value that indicates that the option is a CGA parameters and digital signature option;
        a length field that indicates a length of the option;
        a CGA parameters field that comprises a CGA parameters data structure;
        a digital signature field that comprises an elliptic curve digital signature algorithm (ECDSA) generated digital signature;
        a padding field that is set so that the length of the option is a multiple of about 8 bits; and
        a padding length field that indicates a length of the padding field; and
        a signature length field that indicates a length of the digital signature field.

2. The apparatus of claim 1, wherein implementing the LSEND protocol further comprises:
    receiving a second NS message for address registration refresh from the host node; and
    sending a Neighbor Advertisement (NA) message to the host node.

3. The apparatus of claim 1, wherein the CGA parameters field comprises a public key for the host node that is generated using Elliptic Curve Cryptography (ECC) and not a Rivest, Shamir, and Adleman (RSA) signature algorithm.

4. The apparatus of claim 3, wherein the ECDSA generated digital signature is calculated using the ECC public key and an ECDSA.

5. The apparatus of claim 4, wherein the digital signature is also calculated based on a key hash calculation that uses a secure hash algorithm (SHA)-2 and not of SHA-1.

6. The apparatus of claim 5, wherein the public key and the digital signature are calculated based on a P-256 curve.

7. The apparatus of claim 6, wherein the second NS message comprises a digital signature option that includes a type field that is set to a value that indicates that the option is a digital signature option, a length field that indicates the length of the option, a reserved field that is not used, a key hash field that comprises the most significant 128 bits of a secure hash algorithm (SHA)-2 hash of the public key, a digital signature field that comprises the ECDSA generated signature, and a padding field that that is set so that the length of the option is a multiple of about 8 bits.

8. The apparatus of claim 1, wherein the LLNs comprise at least one of low-bit rate links, short range links, asymmetric links, non-transitive links, resource constrained nodes that are described in an Electrical and Electronics Engineers (IEEE) 802.15.4 standard, and links that are not supported efficiently or optimized using the SEND protocol.

9. The apparatus of claim 1, wherein the LLNs are supported using neighbor discovery optimizations for Internet Protocol (IP) version 6 (IPv6) over Low power Wireless Personal Area Networks (6LoWPANs) including host address registration in Neighbor Solicitation (NS) messages.

10. A network component comprising:
    a receiver at a host configured to receive a router advertisement (RA) from a router;
    a processor configured to generate a public key for the host using Elliptic Curve Cryptography (ECC) and to generate a cryptographically generated address (CGA) using the ECC generated public key and an elliptic curve digital signature algorithm (ECDSA); and
    a transmitter configured to send the ECC generated public key and the ECDSA generated CGA to the router in a unicast neighbor solicitation (NS) message,
    wherein the RA message, the NS message, or both comprise a CGA parameters and digital signature option that comprises:
        a type field that is set to a value that indicates that the option is a CGA parameters and digital signature option;
        a length field that indicates a length of the option;
        a CGA parameters field that comprises a CGA parameters data structure;
        a digital signature field that comprises an ECDSA generated digital signature;
        a padding field that is set so that the length of the option is a multiple of about 8 bits; and
        a padding length field that indicates a length of the padding field; and a signature length field that indicates a length of the digital signature field.

11. The network component of claim 10, wherein the host is an Internet protocol version 6 over Low power Wireless Personal Area Networks (6LoWPAN) node and the router is a 6LoWPAN border router.

12. The network component of claim 10, wherein the NS message is an address registration message that comprises an address registration option (ARO) including an owner interface identifier field that is set to the rightmost 64 bits of the ECDSA generated CGA.

13. The network component of claim 10, wherein the router registers the ECDSA generated CGA in a neighbor cache entry that corresponds to the host.

14. The network component of claim 13, wherein the host further sends the router a second NS message for address registration refresh to keep the neighbor cache entry that corresponds to the host from expiring.

15. The network component of claim 14, wherein the NS message comprises about 240 octets and is encapsulated in about three Institute of Electrical and Electronics Engineers (IEEE) 802.15.4 standard frames, and wherein the second NS message comprises about 152 octets and is encapsulated in about two IEEE 802.15.4 standard frames.

16. A method implemented by a network apparatus comprising:
sending a router advertisement (RA) message to a host node;
receiving a neighbor solicitation (NS) message for address registration comprising a cryptographically generated address (CGA) parameters and digital signature option from the host node;
registering a CGA for the host node that is indicated in the NS message in a neighbor cache; and
sending a neighbor advertisement (NA) message to inform the host node of successful registration,
wherein the CGA parameters and digital signature option comprises:
a type field that is set to a value that indicates that the option is a CGA parameters and digital signature option;
a length field that indicates a length of the option;
a CGA parameters field that comprises a CGA parameters data structure;
a digital signature field that comprises an elliptic curve digital signature algorithm (ECDSA) generated digital signature;
a padding field that is set so that the length of the option is a multiple of about 8 bits; and
a padding length field that indicates a length of the padding field; and
a signature length field that indicates a length of the digital signature field.

17. The method implemented by the network apparatus of claim 16, wherein the ECDSA generated signature is based on secure hash algorithm (SHA)-256 and P-256 curve of Federal Information Processing Standards (FIPS)-186-3.

18. The method implemented by the network apparatus of claim 17 further comprising:
verifying a source address indicated in the NS message with a CGA parameters field in the CGA parameters and digital signature option;
cryptographically checking the ECDSA generated signature in the digital signature field; and
performing a duplicate address detection based on the source address to verify successful registration.

19. The method implemented by the network apparatus of claim 16 further comprising:
receiving a second refresh NS message for address registration refresh comprising a digital signature option from the host node;
refreshing the registered CGA for the host node in the neighbor cache; and
sending a second NA message for address registration refresh to inform the host node of successful refresh registration refresh.

20. The method implemented by the network apparatus of claim 19 further comprising:
using a key hash field in the digital signature option in the second NA message to find a public key for the host node in the neighbor cache; and
verifying a digital signature in the digital signature option to verify successful registration refresh.

21. An apparatus comprising:
a lightweight secure neighbor discovery (LSEND) for low-power and lossy network (LLN) node configured to send an address registration neighbor solicitation (NS) message comprising a cryptographically generated address (CGA) parameters and digital signature option and a source address that is set to the LSEND for LLN node's CGA,
wherein the CGA parameters and digital signature option comprises:
a type field that is set to a value that indicates that the option is a CGA parameters and digital signature option;
a length field that indicates a length of the option;
a CGA parameters field that comprises a CGA parameters data structure;
a digital signature field that comprises an elliptic curve digital signature algorithm (ECDSA) generated digital signature;
a padding field that is set so that the length of the option is a multiple of about 8 bits; and
a padding length field that indicates a length of the padding field; and
a signature length field that indicates a length of the digital signature field.

22. The apparatus of claim 21, wherein a subnet prefix field of CGA parameters in the CGA parameters and digital signature option is set to the leftmost 64 bits of the LSEND for LLN node's CGA, and wherein a public key field of the CGA parameters is set to the LSEND for LLN node's elliptic curve cryptography (ECC) public key.

23. The apparatus of claim 22, wherein the LSEND for LLN node is configured to set an owner interface identifier field in an address registration option (ARO) to the rightmost 64 bits of the LSEND for LLN node's CGA.

24. The apparatus of claim 23, wherein the LSEND for LLN node is an Internet Protocol (IP) version 6 (IPv6) over Low power Wireless Personal Area Network (6LoWPAN) node (LN) configured to receive a router advertisement (RA) sent from a 6LoWPAN border router (6LBR) and to generate its own CGA using ECC, and wherein the LSEND for LLN node sends the address registration NS message with the ARO to the 6LBR.

25. The apparatus of claim 24, wherein the LSEND for LLN node's generated CGA comprises a public key in the CGA parameters, wherein the public key is a distinguished encoding rules (DER)-encoded abstract syntax notation one (ASN.1) structure of the type SubjectPublicKeyInfo and formatted as an ECC public key, and wherein an AlgorithmIdentifier contained in the DER-encoded ASN.1 structure of the type SubjectPublicKeyInfo is an unrestricted id-ecPublicKey algorithm identifier, which is object identifier (OID) 1.2.840.10045.2.1.

\* \* \* \* \*